June 15, 1965 E. STRICK 3,189,853

FILTER FOR THE CANCELLATION OF DELAYED SIGNALS

Filed Sept. 26, 1960 3 Sheets-Sheet 1

INVENTOR:
E. STRICK
BY: Theodore E. Bieber
HIS ATTORNEY

June 15, 1965 E. STRICK 3,189,853

FILTER FOR THE CANCELLATION OF DELAYED SIGNALS

Filed Sept. 26, 1960 3 Sheets-Sheet 2

INVENTOR:
E. STRICK

BY: Thomas E. Bieber

HIS ATTORNEY

June 15, 1965 E. STRICK 3,189,853

FILTER FOR THE CANCELLATION OF DELAYED SIGNALS

Filed Sept. 26, 1960 3 Sheets-Sheet 3

INVENTOR:
E. STRICK
BY Theodore E. Bieber
HIS ATTORNEY

United States Patent Office 3,189,853

Patented June 15, 1965

3,189,853

FILTER FOR THE CANCELLATION OF DELAYED SIGNALS

Ellis Strick, Bellaire, Tex., assignor to Shell Oil Company, New York, N.Y., a corporation of Delaware Filed Sept. 26, 1960, Ser. No. 58,569
2 Claims. (Cl. 333—76)

This invention relates to a passive filter system that will remove the delayed signals from an electrical waveform that is composed of a directly arriving signal and one or more delayed signals.

These undesirable delayed signals arise in many technical fields. In seismology, for example, they occur when a signal which desirably goes down from the explosive source to an interference deep in the earth and then back up to a detector (which is approximately horizontal with the source) also arrives as a delayed signal at the above detector after being reflected from additional boundaries. These reflections from additional interfaces may occur either before or after the signal impinges on the deep interface. If an additional boundary is close to the source, then the outgoing energy from the explosion will contain a delayed signal which is known to the art of seismology as a ghost. On the other hand, if two such additional boundaries are parallel, i.e. form a layer, and tend to trap the energy, an indefinite number of reflections can take place giving rise to an indefinite number of delayed signals. Because of the filtering action of such a layer these delayed signals combine in proper phase to give rise to what in the art is known as oscillations, ringing, singing, multiples, etc. In acoustics or underwater sound an echo which corresponds to our delayed signal is added to the desired direct signal when a wall or air-water interface is located close to the sound or detector. Also, in electrical circuits due to a mismatch of a transmission line its equivalent undesired delayed signals can appear in the circuits.

It is the principal object of this invention to provide a general class of filters that will eliminate or substantially reduce in amplitude these delayed signals without appreciably distoring the desired signal. These filters are called comb filters which term refers to a filter whose amplitude has an infinite number of maxima and minima.

A further object of this invention is to provide a comb filter capable of removing undesired signals from a current signal to provide an output signal which can be obtained by a voltage measuring device.

Another object of this invention is to provide a novel comb filter having a finite number of branches which is capable of removing unwated signals from a signal containing the unwanted signals in addition to the desired signal.

A still further object of this invention is to provide a novel filter system using a passive network to remove unwanted signals from a recorded seismic signal.

A still further object of this invention is to provide a novel filter using a passive network for removing the undesired echo signals in a marine seismic signal.

In the past it has been suggested that these unwanted delayed signals could be removed by mechanical time-shift filtering as described in copending applications, Serial No. 13,633, filed March 8, 1960, and entitled "Echo Cancellation in Seismic Signals," and Serial No. 18,052, filed March 28, 1960, and entitled "Method and Device for Recording Seismograms." The principle of operation of these systems is that the given waveform or a reproduction of it is actually delayed by the necessary time interval, multiplied by an appropriate amplitude factor and then added to the original waveform. In this invention the original waveform is not delayed in time but instead, the incoming waveform is sampled by an electrical network whose inductive, capacitive and resistive elements are of predetermined size to develop across the load by a Fourier syntheses a delayed waveform which is of opposite sign to the desired signals to cancel out the delayed signals as they arrive in the original waveform.

This invention has the advantage over other methods for removing delayed signals in that it requires no moving parts or adjustable electrical circuits. Furthermore, compared with delay lines it does not have an insertion loss and it introduces a minimum of noise and distortion into the recording system. Although the precisely derived system suggests an infinite number of elements, it shall be demonstrated that a very good approximation to the complete cancellation of the undesired signals can be obtained by neglecting all but a finite number of branches of the derived comb filter network.

The above objects and advantages of this invention are obtained by transforming the complete signal including the undesired portion from a time domain to a frequency domain. When the signal is represented in frequency domain one can derive the values for the various elements of the passive filter circuit that are required to remove the undesired signals. When an infinite number of parallel branches are required to completely remove the undesired signals satisfactory results are obtained using a finite number of branches. More particularly the various branches of the filter are selected to resonate at selected harmonics of the undesired signals.

The above objects and advantages of this invention will be more easily understood from the following detailed description of preferred embodiments when taken in conjunction with the attached drawings, in which.

Figure 1:
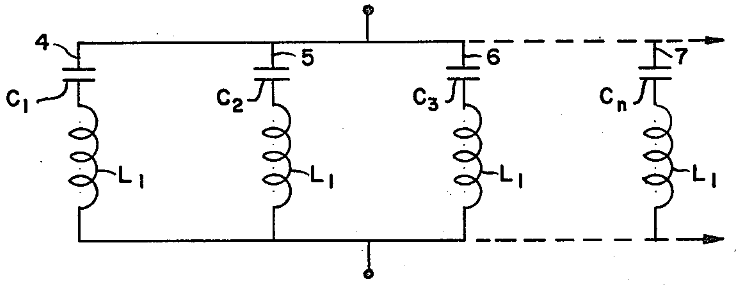
FIGURES 1 to 3 illustrate an embodiment of the invention for removing a single unwanted signal from a composite signal.

The invention will be more easily understood from the following detailed description of a system designed to remove a single delay signal from a composite signal. Consider a given waveform $S(t)$ that is composed of a directly received signal $S_0(t)$ and a single echo or delayed signal $S_0(t-\tau_1)$ arriving at a time $\tau_1$, the amplitude of the echo relative to the direct signal being $k_1$. Mathematically we have $$S(t)=S_0(t)+k_1S_0(t-\tau_1) \quad (1)$$

The filter required to remove the echo signal in Equation 1 is arrived at by mathematically representing Equation 1 in the frequency domain ($\omega$) rather than in the time domain ($t$). Thus $$S(\omega)=S_0(\omega)+k_1e^{-i\omega\tau_1}S_0(\omega)$$
$$S(\omega)=(1+k_1e^{-i\omega\tau_1})S_0(\omega) \quad (2)$$

Now given $S(\omega)$ one can in general obtain $S_0(\omega)$ by means of an inverese filter ($F_1(\omega)$) and Equation 2 can be written in the form $$F_1(\omega)\cdot S(\omega)=S_0(\omega) \quad (3)$$

Then upon eliminating $S(\omega)$ between Equations 2 and 3 one finds that the required filter takes the form $$F_1(\omega)=\frac{R_0}{1+k_1e^{-i\omega\tau_1}} \quad (4)$$

where the resistor $R_0$ has been inserted so that $F_1(\omega)$ will have the dimensions of an impedance.

In order to arrive at the required comb filter which corresponds to Equation 4, one need only note that by exact algebraic manipulation $F_1(\omega)$ as defined by Equation 4 can be re-expressed in the form $$F_1(\omega)=R_0+\frac{\left(\frac{1-k_1}{1+k_1}\right)R_0Z_{oc}}{\left(\frac{1-k_1}{1+k_1}\right)R_0+Z_{oc}}+\frac{\left(\frac{1+k_1}{1-k_1}\right)R_0Z_{sc}}{\left(\frac{1+k_1}{1-k_1}\right)R_0+Z_{sc}} \quad (5)$$

Figure 2:
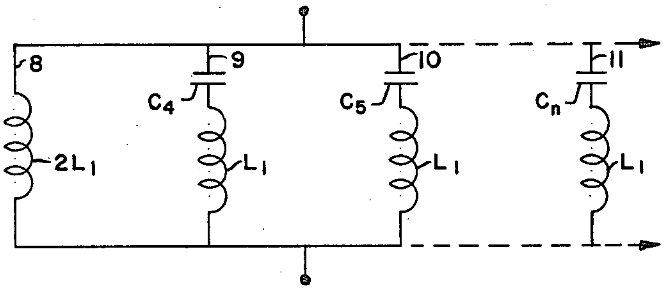

In Equation 5 the numerical value of $R_0$ is also arbitrary since it was introduced orginally in Equation 4 for dimensional reasons. $Z_{oc}$ is defined as a parallel network having an infinite number of branches as shown in FIGURE 1 and $Z_{sc}$ is also a parallel network with an infinite number of branches as shown in FIGURE 2. Referring to the left hand branch 4 of $Z_{oc}$ it is required in order for the filter to properly cancel the delayed signal, that $L_1$ and $C_1$ be selected in terms of the delay time $\tau_1$ by $$L_1=\frac{R_0\tau_1}{4} \quad (6)$$

$$C_1=\frac{4\tau_1}{\pi^2R_0} \quad (7)$$

from which the fundamental resonant frequency $f$ of branch 4 is $$f=\frac{1}{2\pi\sqrt{L_1C_1}}=\frac{1}{2\tau_1} \quad (8)$$

The values of capacitors $C_2$, $C_3$ and $C_n$ in branches 5, 6 and 7, respectively, are selected so that these branches resonate at odd harmonics of the fundamental frequency of Equation 8. Similarly, in FIGURE 2 the values of $C_4$ and $C_5$ are chosen so that the branches resonate at even harmonics of the fundamental freqency of Equation 8. However, branch 8 of FIGURE 2 does not contain a resonant frequency unless it is taken to be zero frequency, thus branch 8 is composed of a single inductance which is twice that of the $L_1$ of each of the other branches of both FIGURES 1 and 2.

With the physically significant parameters now properly defined one can refer back to Equation 5 which suggest that the circuit $F_1(\omega)$ is thus the sum of a resistance 13 representing $R_0$ an impedance formed by a resistance 14 in parallel with $Z_{oc}$ and another impedance formed by a resistance 16 and $Z_{sc}$. The resistance 14 is selected to be equal to $$R_0\left(\frac{1-k_1}{1+k_1}\right)$$

while resistance 16 is equal to $$R_0\left(\frac{1+k_1}{1-k_1}\right)$$

Figure 3:
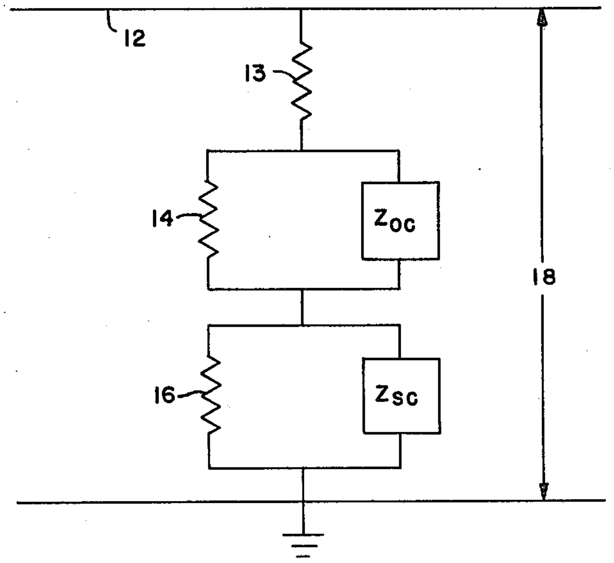

If the resistances 14 and 16 are so chosen the circuit of FIGURE 3 will remove the undesired echo whether the amplitude $k_1$ of the echo is positive or negative. It is this form of $F_1(\omega)$ that will practically convert the input current waveform 12 into the voltage output waveform 18 free of the unwanted echo signal.

Figure 4:
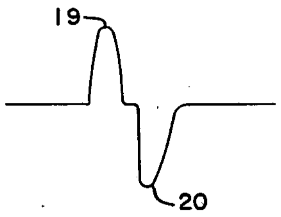
FIGURES 4 and 5 illustrate a signal before and after treatment using the filter of FIGURES 1 to 3.
Figure 5:
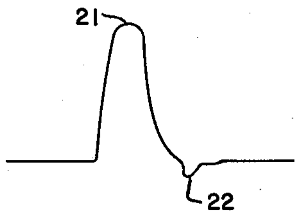

The comb filter shown in FIGURE 3 was constructed and the synthetic signal shown in FIGURE 4 applied to the filter. The signal of FIGURE 4 was generated by using a function generator consisting of a free-running symmetrical multivibrator to supply a triggering spike voltage to a single-cycle cathode-coupled biased multivibrator as well as a synchronizing spike to the common sweep circuit of an oscilloscope. The signal from the multivibrator was passed through a series of resistance, inductance and capacitance networks in order to produce the waveform shown in FIGURE 4. This waveform consists of a signal or pulse 19 arriving at the time $t=0$ and 12 milliseconds later occurred another signal or pulse 20 having precisely the same shape but opposite polarity from 19. Thus, 19 corresponds to the desired signal $S_0(t)$ and 20 corresponds to the delayed undesired signal $S_0(t-\tau_1)$ with $k_1=-1$. The waveform of FIGURE 4 was then introduced as a current waveform into the filter of FIGURE 3 using only 5 branches with the parameters adjusted for $k_1=-1$. The output voltage was then measured and found to have the form of FIGURE 5. Note that the desired signal 21 has been negligibly distorted from the original signal 19 whereas the the delayed signal 22 is practically non-existent when compared with its original unfiltered form 20.

Figure 6:
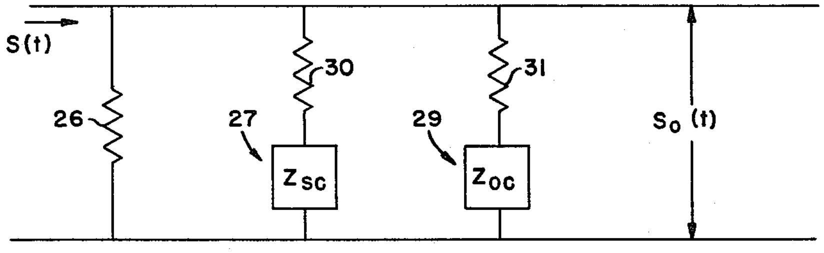
FIGURE 6 illustrates an embodiment of the invention for removing an infinite number of delayed signals from a composite signal; and, FIGURES 7 and 8 illustrate an embodiment of the invention for removing the echoes from the recorded signal of a marine seismic exploration system.

Another embodiment of the present invention is illustrated in FIGURE 6 and is designed to remove an infinite number of undesired signals as occur in Equation 9

$$S(t)=S_0(t)-K_2S_0(t-\tau_2)+k_2^2S_0(t-2\tau_2)-k_2^3S_0(t-3^{\tau}{}_2)+\ldots+(-1)^nk_2^nS_0(t-n\tau_2)+\ldots \quad (9)$$

which in the frequency doman $\omega$ becomes $$S(\omega)=[1-k_2e^{-i\omega\tau_2}+k_2^2e^{-2i\omega\tau_2}-k_2^3e^{-3i\omega\tau_2}+\ldots+(-1)^nk_2^ne^{-ni\omega\tau_2}]S_0(\omega) \quad (10)$$

The infinite series of Equation 10 can be written in the form $$S(\omega)=\left[\frac{1}{1+k_2e^{-i\omega\tau_2}}\right]S_0(\omega) \quad (11)$$

Just as in Equation 3, a filter $F_2(\omega)$ is required to convert the current waveform $S(t)$ to the voltage waveform $S_0(t)$ free of undesired signals. Preceding in exactly the same manner as in Equation 3 but with the subscript 2 replacing the subscript 1, one obtains $$F_2(\omega)=R_0[1+k_2e^{-i\omega\tau_2}] \quad (12)$$

where an arbitrary resistance $R_0$ has again been inserted for dimensional considerations. Since $F_2(\omega)$ in Equation 12 is (aside from an unimportant constant factor, of course, the subscript) the reciprocal of $F_1(\omega)$ in Equation 4, the filter required can be obtained from reciprocal of the expression for $F_1(\omega)$ in Equation 5. Then after algebraic manipulation one finds $$F_2(\omega)=\frac{1}{\frac{1}{R_0}+\frac{1}{\left(\frac{1-k_2}{1+k_2}\right)R_0+Z_{sc}}+\frac{1}{\left(\frac{1+k_2}{1-k_2}\right)R_0+Z_{oc}}} \quad (13)$$

where $Z_{sc}$ and $Z_{oc}$ are still defined by FIGURES 1 and 2 and $L_2$ and $C_2$ by Equations 6 and 7 with, of course, the subscript 2 replacing the subscript 1.

Equation 13 results in the circuit shown in FIGURE 6 in which the current waveform of the signal $S(t)$ is passed into the filter and its output measured as a voltage signal $S_0(t)$. The filter of FIGURE 6 is formed by a resistance 26 equal to $R_0$ in parallel with two filter branches 27 and 29. The branch 27 has a resistance 30 in series with $Z_{sc}$ while branch 29 has resistance 31 in series with $Z_{oc}$. The resistances 30 and 31 are equal to the quantities $$R_0\left(\frac{1-k_2}{1+k_2}\right) \text{ and } R_0\left(\frac{1+k_2}{1-k_2}\right)$$

respectively.

Figure 7:
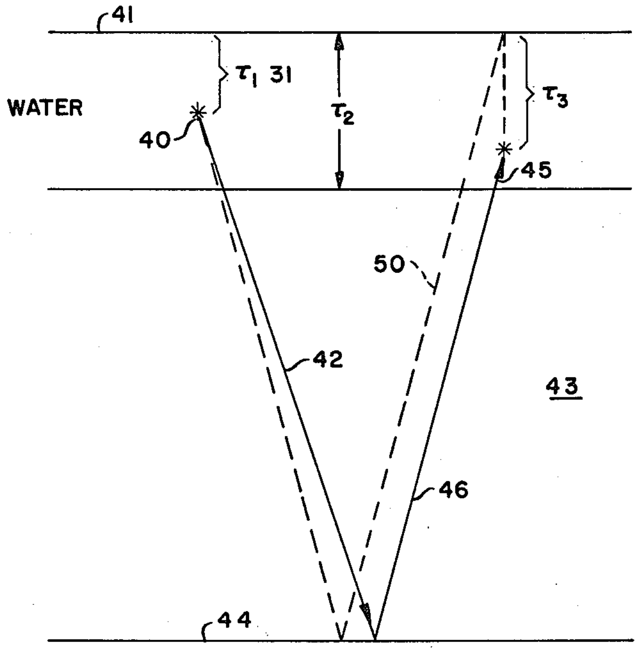

Referring to FIGURE 7, there is shown a marine seismic system in which a source of seismic energy 40 is located a distance below the surface of the water 41. The source of seismic energy 40 may be a charge of explosive or a sparking device or other means of generating acoustical or elastic waves. When the source 40 is actuated it will generate acoustical or elastic waves which travel in all directions including a downward direction illustrated by the vector 42. The downwardly traveling waves enter the earth formation 43 underlying the body of water and travel down until they are reflected by an interface 44 between different types of formations within the earth formation. The interface 44 will reflect waves upwardly through the water where they are detected by detector 45 located below the water surface. The reflected seismic waves are illustrated by the vector 46. While a portion of the reflected waves are detected by the detector 45 another portion will pass the detectors and be reflected by the interface 41 between the surface of the water and the atmosphere. The waves which are reflected by the water surface will also be detected by the detector 45 as they travel downward and appear as an echo in the recording of the seismic waves. The surface reflected waves are illustrated by the dotted line 50 in FIGURE 7. The time required for the seismic energy to travel from the source 40 to the surface 41 and back to the source 40 is denoted as $\tau_1$; similarly $\tau_2$ denotes the time required for the energy to travel twice through the water and $\tau_3$ denotes the time required for the energy to travel from the detector 45 to the surface 41 and back.

From the above description it can be seen that if the seismic signal in which one is interested is $S_0(t)$ the actual signal recorded $S(t)$ will be equal to $S_0(t)-nt$. Again the signal is shown in the time domain but it may be transformed into the frequency domain ($\omega$) and have the following form:

$$S(\omega)=\frac{(1+k_1e^{-2i\omega\tau_1})(1-k_1e^{-2i\omega\tau_3})}{(1+k_2e^{-i\omega\tau_2})^2}S_0(\omega) \qquad (14)$$

In the transformed signal a signal $k_1$ equals $k_3$ and denotes the reflection coefficient for the boundary between the surface 41 and the atmosphere. For velocity, displacement or acceleration detectors $k_1=+1$ while for pressure detection $k_1=-1$. Similarly, $k_3$ denotes the reflection coefficient for the interface 44.

In order to filter out the effect of source 40 location and detector 45 location and multiple bouncing within the layer one needs to construct the inverse filter to (14). Just as in arriving at Equations 4 and 12 one obtains here $$F(\omega)=\frac{(1+k_2e^{-i\omega\tau_2})^2}{(1+k_1e^{-i\omega\tau_1})(1+k_3e^{-i\omega\tau_3})} \qquad (15)$$

Operationally Equation 15 can be written in the form $$F(\omega)2F_1(\omega)\cdot F_2(\omega)\cdot F_2(\omega)\cdot F_3(\omega) \qquad (16)$$

where the ordering of the subscripts is unimportant. $F_1(\omega)$ is given by Equation 4 and FIGURE 3. $F_2(\omega)$ is given by Equation 12 and FIGURE 6. $F_3(\omega)$ is also given by Equation 4 and FIGURE 3 with the subscript 3 replacing the subscript 1. Physically $F_1(\omega)$ describes the sum of the energy which leaves the source 32 and progresses directly towards the interface 44 and the energy which first proceeds upward from the source 32, is reflected downwardly by the upper boundary 41 after multiplication by $k_1$ and then proceeds downwardly to the interface 44. Thus, $F_1(\omega)$ takes into account the direct outgoing signal and a single delayed echo of that signal. Likewise, $F_3(\omega)$ is composed of the energy received directly from the interface 44 by the detector 45 and the energy which passes by the detector 45 to the upper boundary 41 and after multiplication by $k_3$ proceeds downwardly to the detector 45. Thus it is seen that $F_1(\omega)$ and $F_3(\omega)$ can be processed by the filters described above and shown in FIGURES 4 and 6.

$F_2(\omega)$ in Equation 16 on the other hand has the same form of Equation 9 and is equivalent to the treatment of an infinite number of delayed signals where the coefficients increase in a geometric progression. $F_2(\omega)$ is repeated because the energy from the reflector 45 can also go through successive traverses of the water before reaching the detector 45.

Figure 8:
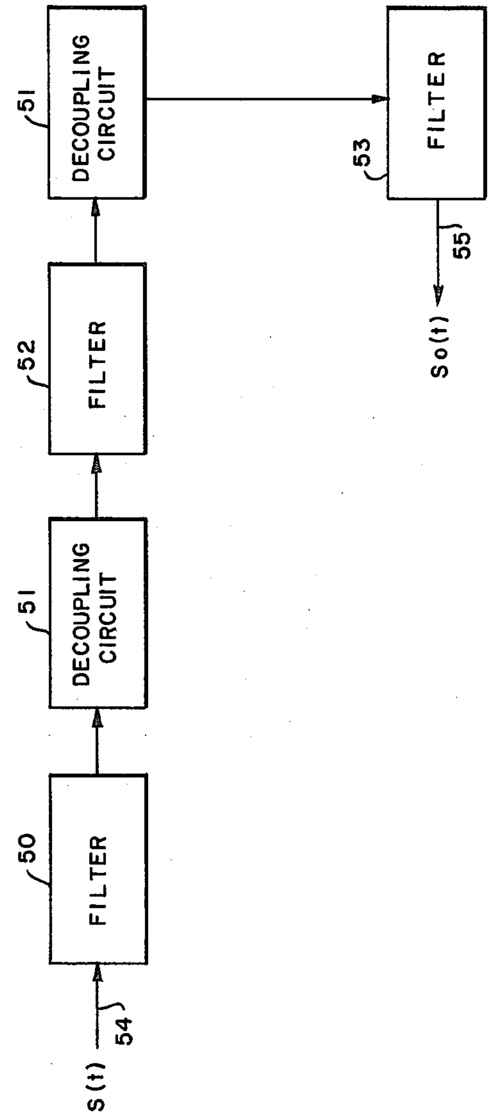

FIGURE 8 illustrates in a block diagram the composite filter required to remove the undesired signals from the signal of Equation 14. The filter 50 is the filter of FIGURE 3 and is coupled to filter 52 by a decoupling circuit 51. The decoupling circuit may be a resistor, vacuum tube or the like and converts the voltage signal from filter 50 to a current signal. The filter 52 is coupled to the filter 53 by a similar decoupling circuit 51. The filter 52 is the type of filter of FIGURE 6, while filter 53 is the type of filter shown in FIGURE 3. Thus, it is seen that the filters shown in FIGURES 3 and 6 can be combined to remove the undesired echo signals from a marine seismic signal.

In most situations, especially in seismic exploration, a rather narrow band of frequencies are utilized. Therefore very few of the branches of $Z_{oc}$ and $Z_{sc}$ are required. In seismic exploration the three branches corresponding to the fundamental and the two lowest harmonics for $Z_{oc}$ and the inductor and the two lowest harmonics for $Z_{sc}$ will cover the existing bandwidth properly. However, in many instances one can obtain good results using only one harmonic and in other cases such as in water reverberations where a single frequency predominates only a single branch tuned to the reverberations frequency may be necessary. However, in water reverberation work it may be necessary to utilize two decoupled branches tuned to the same resonant frequency in order to satisfy Equation 14. It may be necessary when using only a single branch of the filter circuit shown in FIGURES 3 and 6 to use a series of resonant circuits having serially coupled inductive capacitive and resistive elements. In this case, the values of the various elements should be chosen in accordance with the above equations for $R_0$, $C_1$ and $L_1$.

While various embodiments of this invention have been described it should not be limited to the details described but only to its broad spirit and scope.

I claim as my invention:

1. A passive circuit for removing undesired signals which appear as reflections of the desired seismic signal contained in a composite seismic signal, said circuit comprising:

a plurality of individual filter circuits coupled in series by decoupling circuits;

at least one of said individual filter circuits comprising a first branch having a resistance in parallel with an impedance filter and a second branch having a resistance in series with an impedance filter, said second branch being in series with said first branch;

at least another of said individual filters comprising a third branch having a resistance in series with an impedance filter and a fourth branch having a resistance in series with an impedance filter, said fourth branch being in parallel with said third branch;

the resistance of said first and second branches having a value equal to $$\left(\frac{1-k}{1+k}\right)R_0$$

in which $k$ is a constant having the value between plus 1 and minus 1 and $R_0$ is the resistance of high ohmic value and the resistance of said second and fourth branches has a value equal to $$\left(\frac{1+k}{1-k}\right)R_0$$

in which $k$ and $R_0$ have the above values.

2. The filter of claim 1 in which the impedance filter of the first branch and the fourth branch consists of inductances having a value $$\frac{R_0\tau_1}{4}$$

and capacitances having a value $$\frac{4\tau_1}{R_0\pi^2n^2}$$

where $\tau_1$ equals the travel time of the desired seismic signal from a recording point to a reflecting interface surface and back to the recording point and $n$ is an odd number and the impedance filter of the second branch and the third branch consists of inductances and capacitances having the above values in which $n$ is an even number.

(References on following page)

References Cited by the Examiner

UNITED STATES PATENTS

| | | | |
|---|---|---|---|
| 1,610,336 | 12/26 | Stone | 333—70 |
| 1,644,004 | 10/27 | Zobel | 333—70 |
| 2,016,264 | 10/35 | Blau | 333—70 |
| 2,024,900 | 12/35 | Wiener | 333—70 |
| 2,124,599 | 7/38 | Wiener | 333—70 |
| 2,263,376 | 11/41 | Blumlein | 333—70 |
| 2,680,151 | 6/54 | Boothroyd | 333—70 |
| 2,682,037 | 6/54 | Bobis | 333—76 |
| 2,832,937 | 4/58 | Ule | 333—70 |
| 2,916,724 | 12/59 | Peterson | 333—70 |
| 2,968,011 | 1/61 | Schouten et al. | 333—20 |

OTHER REFERENCES

Publication B: Flesher and Cohn: "General Theory of Comb Filters," National Electronics Conference Proceeding, V. 14, 1958, p. 282–95.

Publication A: Lubback: "Optimization of Class of Non-Linear Filters," Institute of Electrical engineers Proceedings, V. 107, pt. C, N11; (Monograph n 344) March 1960, pp. 60–74.

The Theory of Networks, by Rogers, 1957, page 263 cited.

HERMAN KARL SAABACH, *Primary Examiner.*

IRVING L. SRAGOW, CHESTER L. JUSTUS, *Examiners.*